United States Patent
Li et al.

(10) Patent No.: US 9,130,713 B2
(45) Date of Patent: Sep. 8, 2015

(54) DATA PACKET COMMUNICATIONS IN A MULTI-RADIO ACCESS ENVIRONMENT

(75) Inventors: Zhenhong Li, Shanghai (CN); Haifeng Wang, Shanghai (CN); Wu Gang, Shanghai (CN); Zou Wei, Shanghai (CN); Jorma Lilleberg, Oulu (FI); Kari Rikkinen, Ii (FI)

(73) Assignee: Nokia Technologie Oy, Espoo (FI)

( * ) Notice: Subject to any disclaimer, the term of this patent is extended or adjusted under 35 U.S.C. 154(b) by 503 days.

(21) Appl. No.: 12/459,571

(22) Filed: Jul. 2, 2009

(65) Prior Publication Data

US 2011/0002246 A1 Jan. 6, 2011

(51) Int. Cl.
*H04W 72/00* (2009.01)
*H04W 36/00* (2009.01)
*H04L 1/00* (2006.01)
*H04W 28/22* (2009.01)
*H04W 88/06* (2009.01)

(52) U.S. Cl.
CPC ............. *H04L 1/0043* (2013.01); *H04W 28/22* (2013.01); *H04W 88/06* (2013.01)

(58) Field of Classification Search
CPC ..... H04W 72/00; H04W 36/00; H04W 40/00; H04W 74/00
USPC ........ 455/450, 426.1, 73, 436, 509, 524–525, 455/552.1, 553.1, 443–444; 370/328, 338, 370/341, 329
See application file for complete search history.

(56) References Cited

U.S. PATENT DOCUMENTS

| | | | |
|---|---|---|---|
| 2005/0250505 A1* | 11/2005 | Rasanen | 455/450 |
| 2005/0255805 A1* | 11/2005 | Hottinen | 455/8 |
| 2007/0087745 A1* | 4/2007 | Poyhonen et al. | 455/432.1 |
| 2007/0173283 A1* | 7/2007 | Livet et al. | 455/552.1 |
| 2007/0195690 A1* | 8/2007 | Bhushan et al. | 370/208 |
| 2007/0291868 A1* | 12/2007 | Olesen et al. | 375/267 |
| 2008/0025329 A1* | 1/2008 | Livet et al. | 370/406 |
| 2008/0070611 A1* | 3/2008 | Yi et al. | 455/515 |
| 2008/0130548 A1* | 6/2008 | Kaikkonen et al. | 370/312 |
| 2008/0165872 A1* | 7/2008 | Kwon et al. | 375/260 |
| 2008/0227456 A1* | 9/2008 | Huang et al. | 455/436 |
| 2009/0016245 A1* | 1/2009 | Karls | 370/310 |
| 2009/0028074 A1* | 1/2009 | Knox | 370/278 |
| 2009/0067368 A1* | 3/2009 | McAndrews et al. | 370/328 |
| 2009/0180451 A1* | 7/2009 | Alpert et al. | 370/338 |
| 2010/0009676 A1* | 1/2010 | Cormier et al. | 455/426.1 |
| 2010/0022193 A1* | 1/2010 | Melis et al. | 455/73 |
| 2010/0062800 A1* | 3/2010 | Gupta et al. | 455/552.1 |
| 2010/0111047 A1* | 5/2010 | Yang et al. | 370/336 |
| 2010/0180006 A1* | 7/2010 | Nourbakhsh et al. | 709/213 |

OTHER PUBLICATIONS

3GPP TR 22.934, "Feasibility Study on 3GPP System to Wireless Local Area Network (WLAN) Interworking" (Release 6), v6.2.0, Sep. 2003.

Joachim Sachs et al., "Future Wireless Communication Based on Multi-Radio Access", WWRF11, Oslo, Norway, 2004.

(Continued)

*Primary Examiner* — Kent Chang
*Assistant Examiner* — William Lu
(74) *Attorney, Agent, or Firm* — Harrington & Smith

(57) ABSTRACT

More than one radio-access technology is supported in an apparatus, and channel-coding functions in the apparatus are shared between at least two of said more than one radio-access technology.

17 Claims, 4 Drawing Sheets

(56) References Cited

OTHER PUBLICATIONS

Joachim Sachs et al., "Assessment of the Access Selection Gain in Multi-Radio Access Networks", European Transactions on Telecommunications, Nov. 2007, vol. 20, Issue 3, pp. 265-279.

G. P. Koudouridis et al., "Multi-Radio Access in Ambient Networks", IEEE INFOCOM, 2006.

G. P. Koudouridis et al., "Generic Link Layer Functionality for Multi-Radio Access Networks", WWI Ambient Networks, http://www.ambient-networks.org/.

3GPP TS 25.212, "Multiplexing and Channel Coding (FDD)" (Release 8), v8.5.0, Mar. 2003.

3GPP TS 36.212, "Evolved Universal Terrestrial Radio Access (E-UTRA), Multiplexing and Channel Coding" (Release 8), v8.7.0, May 2009.

\* cited by examiner

DATA PACKET COMMUNICATIONS IN A MULTI-RADIO ACCESS ENVIRONMENT

TECHNICAL FIELD

The present invention relates to multi-radio solutions. The invention relates especially, but not exclusively, to integrating radio parts of more than one radio-access technology.

BACKGROUND ART

An increasing number of deployed radio access networks are based on different radio access technologies (RATs). The availability of multiple access alternatives offers the flexibility of using different RATs and the capability of increasing the overall transmission capacity, providing better service quality and reducing the deployment costs for wireless access. In the future, a mixture of heterogeneous radio technologies will be available. Presently, mobile terminals have the capability for versatile usage of radio communication resources, for example EGSM/HSPA/WLAN/BT/etc. This multi-radio access situation opens the potential to provide access to any network in an "always best connected" fashion. Certain considerations involve utilizing several access techniques simultaneously. In certain considerations they do not even have to be provided by the same network operator.

Multi-radio access technologies have been given a lot of emphasis recently. A modern base station platform expands its supported technologies to cover GSM/EDGE, WCDMA/HSPA and LTE—all running concurrently in a single unit. It supports a multi-radio access technology in order to meet the needs of new and existing 2G and 3G operators who can use their existing infrastructure to deploy new network-wide technologies via simple software upgrade to 3G or LTE.

A general problem is how a user data packet or flow can be transmitted more efficiently in a multi-radio access environment. Different integration options have been identified which provide different capabilities with respect to interworking scenarios and requirements. Coupling between multiple RATs refers to the extent of co-ordination and collaboration across different radio access technologies. The purpose for such collaboration is ultimately the enhancement of the user experience given the QoS requirements and constraints on available radio resources.

SUMMARY

According to a first example aspect of the invention there is provided a method comprising:
supporting more than one radio-access technology in an apparatus; and
sharing a channel-coding function in the apparatus between at least two of said more than one radio-access technology.

The channel-coding function may refer to channel coding performed on a low level of a protocol stack. An example of the low level is a physical layer (L1). Another example, depending on the implementation, may by the data link layer (L2) or a combined L1/L2 layer. The layers may refer to the well-known ISO OSI model.

The channel-coding function (or functionality with one or more channel-coding functions) can be shared between two or more different RATs. An advantage is a simpler construction of the apparatus.

In certain example embodiments, the method comprises:
providing a common channel coding unit to be used in both of said at least two radio-access technologies.

In certain example embodiments, the method comprises: processing a data packet of a user in the common channel coding unit to prepare its transmission by said at least two radio-access technologies to a destination simultaneously.

In certain example embodiments, the method comprises: processing a first and a second data packet of a user in the common channel coding unit to prepare a simultaneous transmission of said first and second data packet by a first and second radio-access technology, respectively.

In certain example embodiments, channel-coding function (s) are shared between a single RAT with its different carrier components.

In certain example embodiments, a data packet transmission mechanism in a multi-radio access environment is provided. In certain example embodiments, radio parts of more than one radio-access technology are integrated. In certain example embodiments, this is done in a cost-saving way so that the signal chains of respective radio access technologies share one or more blocks (or units) providing a channel coding function or channel coding functions.

In certain example embodiments, the same data packet or transport block of one user is transmitted from different radio access points to one destination simultaneously.

In certain example embodiments, different data packets or transport blocks of one user are transmitted from each radio access point to one destination simultaneously.

The method according to the first example aspect and its example embodiments may be useful in providing a transmission mechanism in a multi-RAT environment in order to more fully utilize the available resource in each RAT simultaneously. In certain example embodiments, there may be used a multi-radio architecture comprising a multi-radio resource management and a generic link layer on top of the data link and physical layers.

According to a second example aspect of the invention there is provided an apparatus comprising:
a signal processing section configured to support more than one radio-access technology; and
a channel coding unit, in the signal processing section, configured to be shared between at least two of said more than one radio-access technology.

The apparatus may be a mobile terminal or an infrastructure node (or another apparatus in a network). The mobile terminal may be a handheld wireless apparatus, such as a mobile phone.

According to a third example aspect of the invention there is provided an apparatus comprising:
means for supporting more than one radio-access technology; and
means for sharing a channel-coding function in the apparatus between at least two of said more than one radio-access technology.

In certain example embodiments, said means are provided by a channel coding block or unit common to each of said at least two radio-access technologies.

According to a yet another broad example aspect of the invention there is provided a method comprising:
supporting more than one radio-access technology in an apparatus; and
sharing at least one physical layer function in the apparatus between at least two of said more than one radio-access technology.

An example of said physical layer function is a channel coding function. An apparatus may be provided similarly.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements. FIGS. 1a-1d show four different examples of coupling options between multiple radio access technologies (RATs). The radio-access technologies (RAT 1 and RAT 2) in FIGS. 1a-1d may be the same or different RATs. The RATs may be based, for example, on mobile 2G, 3G or LTE technologies, or any other technologies mentioned, for example, in the background art section, such as WLAN, Bluetooth (BT), etc.

Figure 1A:
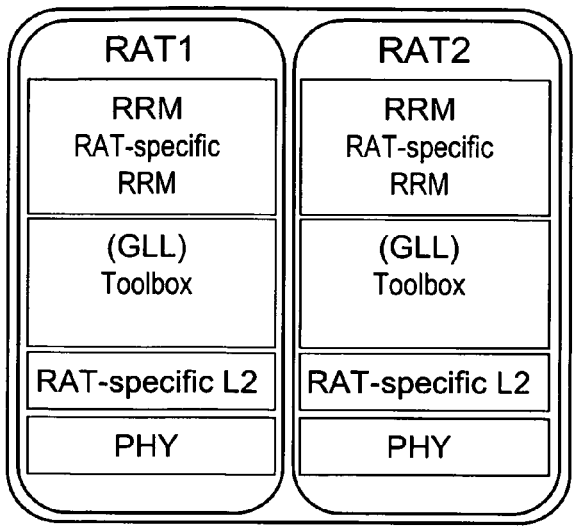
FIGS. 1a-1d show examples of coupling options between RATs.

FIG. 1a shows protocols of an example multi-radio architecture in an example multi-radio protocol stack in a "no coupling" example. There is no collaborative radio resource management across the RATs. And there is no collaborative layer 2 functionality across the RATs. The radio resource management (RRM) is RAT-specific, that is, there is separate RMM for both RAT 1 and RAT 2. Similarly, there may be a general link layer (GLL) for both RAT 1 and RAT 2 on top of the RAT-specific parts of the data link layer (L2). On the bottom there is a physical layer (PHY).

Figure 1B:
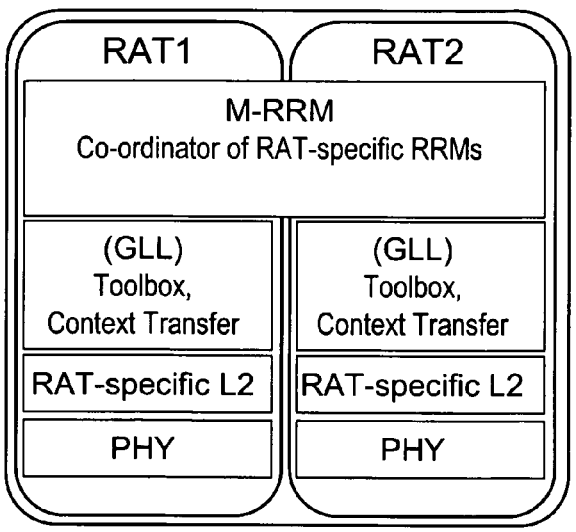

FIG. 1b shows protocols of an example multi-radio architecture in an example multi-radio protocol stack in a "loose coupling" example. Multi-radio resource management (MRRM (or M-RRM)) is performed jointly across the RATs. Otherwise, there is no collaborative layers functionality across the RATS. Each RAT may be associated with an optional GLL entity on top of the RAT-specific parts of the data link layer (L2). On the bottom there is a physical layer (PHY).

The GLL has been conceived as a toolbox of functions that would allow for the control and configuration of L2 functionality of different RATs for user data transmission.

The multi-radio resource management function typically handles the access to radio resources of each RAT. MRRM may comprise RAT co-ordination and network-complementing RRM functions. The former includes the principal co-ordination abilities, such as local/congestion control and radio-access (RA) selection. The latter is a RAT-specific function and may, for example, provide missing RRM functions to legacy or future networks or act as a translation layer between certain RA functions and RA intrinsic RRM functions.

Figure 1C:
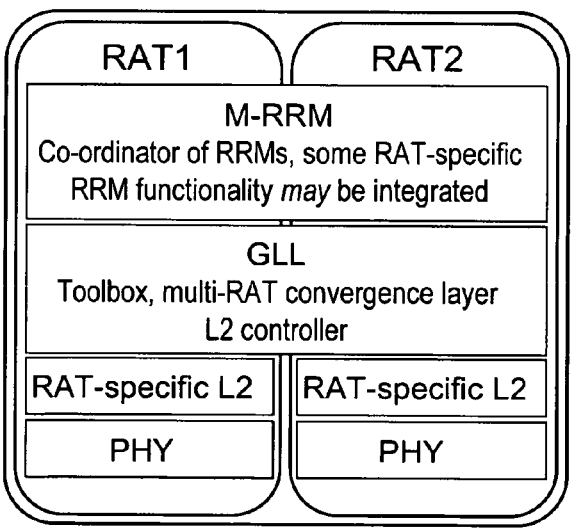

FIG. 1c shows protocols of an example multi-radio architecture in an example multi-radio protocol stack in a "tight coupling" example. The MRRM is performed jointly across the RATs. Some of the RRM functionality for the different RATs may be integrated into the MRRM. In addition, the GLL provides a unified interface to the upper layers, acting as a multi-RAT convergence layer. In that way the GLL function facilitates the co-operation among different access technologies.

Figure 1D:
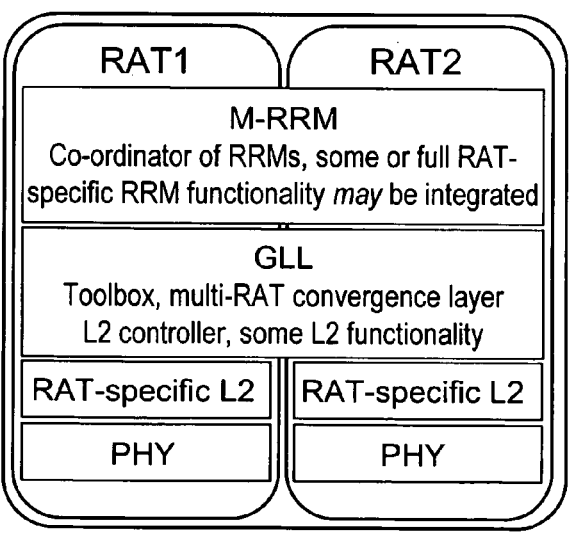

FIG. 1d shows protocols of an example multi-radio architecture in an example multi-radio protocol stack in a "very tight coupling" example. The MRRM is performed jointly across the RATs. Some of the RRM functionality for the different RATs may be integrated into the MRRM. In addition to its role as a toolbox, convergence layer and controller of RAT-specific layer 2 configurations, the GLL may not only control, but also complement certain layer 2 functionalities in order to more fully exploit the potential benefits of multi-radio accesses.

In certain example embodiments, certain L1/L2 function splitting mechanisms in multi-RAT operation (such as in a transmission or reception process) are provided. The splitting mechanisms can be applied, for example, in the "tight coupling" and "very tight coupling" examples to produce yet more tight coupling options.

Figure 2A:
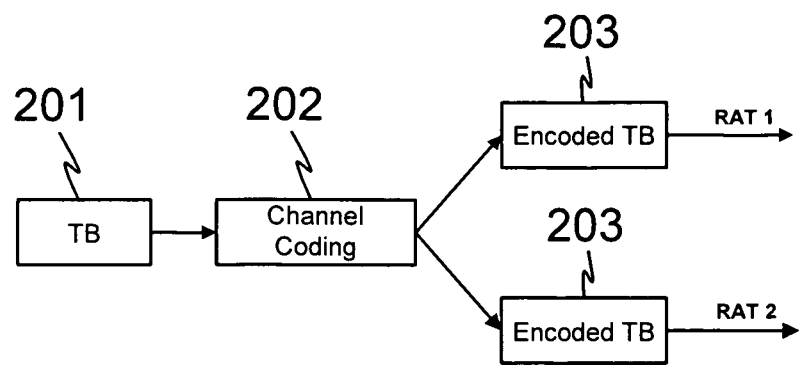
FIGS. 2a-2b show processing of a data packet in accordance with certain example embodiments.
Figure 2B:
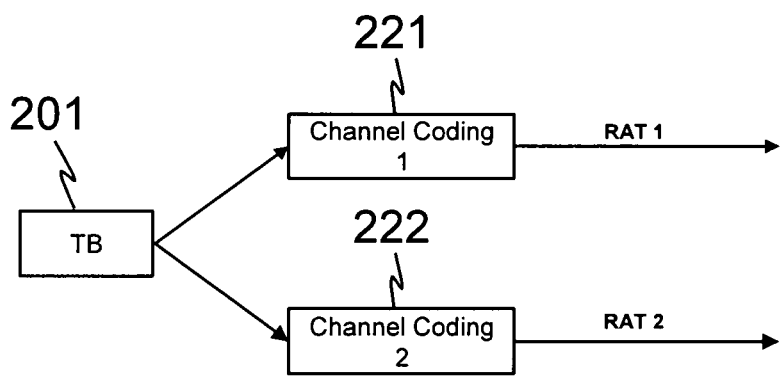

FIGS. 2a-2b show processing of a data packet in accordance with certain example embodiments. It is assumed that multiple RATs are available for the apparatuses concerned and that these apparatuses are capable of simultaneous transmission and/or simultaneous reception over multiple RATs. In other words, the apparatuses are capable of transmitting (and receiving) multi-radio access signals simultaneously. In an example embodiment, a first apparatus communicates user data packets (or a user data flow) to a second apparatus over at least two RATs simultaneously. The first apparatus may be, for example, a user's mobile terminal, and the second apparatus may be, for example, an infrastructure node on a network's side, or vice versa.

In certain example embodiments, it is assumed that the used multi-radio architecture comprises a common multi-radio resource management (MRRM) and a generic link layer (GLL), or similar protocols or functions common for the RATs concerned. In certain example embodiments, the MRRM is responsible for joint management of radio resource between the different RATs in a coordinated manner, and the GLL provides unified link level processing, offering a generic interface towards high layers and adaptation of the underlying RATs. The MRRM (implemented for example as an MRRM unit) manages in certain example embodiments all the available radio access resources, this enabling an overall co-ordination through the selection of the most appropriate RAT(s) to serve each particular user session.

In the example shown in FIG. 2a, a source (data) packet 201 is processed to be transmitted over multiple RATs (RAT 1 and RAT 2) to a destination (not shown). The same data packet is transmitted from different radio access points (represented by RAT 1 and RAT 2) to the destination simultaneously. Common channel coding (or encoding) is performed in a channel coding unit (or block) 202 to produce an encoded data packet 203. After channel coding, the other physical layer procedures and functions, are executed on each RAT independently in an as such well-known manner. The encoded data packet 203 is transmitted via the multiple RATs (RAT 1 and RAT 2) simultaneously. Channel coding methods may include, for example, turbo coding and/or convolutional coding and/or block codes. Turbo codes, for example, may be suitable for use with a variety of RATs.

An example of the data packet 201 is a transport block (TB) or a medium access control protocol or packet data unit (MAC PDU). The channel coding unit 202 may be implemented as a common channel coding unit (or encoder) on a physical layer.

The example shown in FIG. 2b differs from the example shown in FIG. 2a in that instead of performing channel coding in the common physical layer channel coding unit 202, the channel coding (or encoding) of the data packet 201 is performed RAT-dependently. Channel coding for RAT 1 is performed in a channel coding unit 221 and channel coding for RAT 2 is performed in a channel coding unit 222 to produce encoded data packets that are transmitted via the multiple RATs (RAT 1 and RAT 2) simultaneously.

At the receiving side (not shown), independent receivers can be adopted on each RAT. For the example case of the common channel coding (or encoding), suitable decoding at the receiver can be arranged. In addition, bit level combining can be applied for diversity gain, if desired. For the example case of the RAT-dependent channel coding, correctly decoded data packet(s) will be selected at the receiver and processed further.

The example embodiments shown in FIGS. 2a and 2b may be useful when trying to achieve lower latency compared with single RAT systems, to more fully utilize the apparatus with multi-RAT capabilities and free spectrum, or to reduce dropping call rate, for example, during an inter-RAT handover.

Figure 3A:
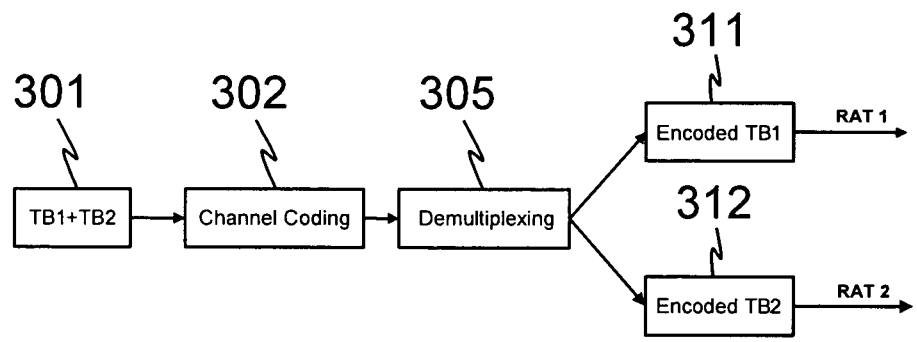
FIGS. 3a-3b show processing of data packets in accordance with certain example embodiments.
Figure 3B:
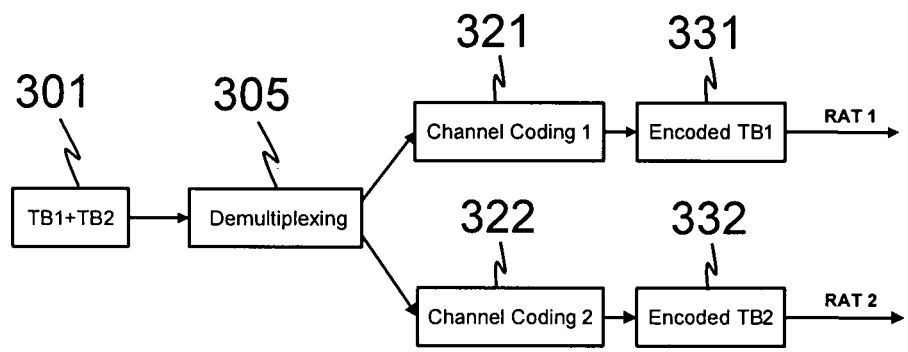

FIGS. 3a-3b show processing of data packets in accordance with certain example embodiments. Similar assumptions as in FIGS. 2a-2b may apply.

In the example shown in FIG. 3a, different source packets from one user are transmitted over multiple RATs. The data packets TB1 and TB2 (reference number 301) from one user are processed to be segmented and transmitted from the different RATs (RAT 1 and RAT 2) to a destination (not shown) simultaneously. Common channel coding (or encoding) is performed in a channel coding unit (or block) 302 to produce encoded data. The encoded data is demultiplexed in a demultiplexing unit or block 305 to produce a first encoded packet 311 and a second encoded packet 312. The encoded packets 311 and 312 may contain data from both of the source data packets TB1 and TB2. Alternatively, the encoded packet 311 may contain data from the source packet TB1 only, and the encoded packet 312 may contain data from the source packet TB2 only. After channel coding (or after demultiplexing), the other physical layer procedures and functions, are executed on each RAT independently in an as such well-known manner. The encoded data packet 311 is transmitted via the RAT 1, and simultaneously, the encoded data packet 312 is transmitted via the RAT 2.

The data packet TB1 (and TB2 similarly) may be, for example, a transport block (TB) or a medium access control protocol or packet data unit (MAC PDU). The channel coding unit 302 may be implemented as a common channel coding unit (or encoder) on a physical layer.

The example shown in FIG. 3b differs from the example shown in FIG. 3a in that instead of performing common channel coding in the common physical layer channel coding unit 302, the channel coding (or encoding) of the data packets TB1 and TB2 is performed RAT-dependently. The data packets TB1 and TB2 are first demultiplexed in a demultiplexing unit or block 305, and channel coding of output data that is inputted into a first channel coding unit 321 is performed in that unit to produce a first encoded packet 331. Similarly, channel coding of output data that is inputted into a second channel coding unit 322 is performed in that unit to produce a second encoded packet 332. The encoded packets 331 and 332 may contain data from both of the source data packets TB1 and TB2. Alternatively, the encoded packet 331 may contain data from the source packet TB1 only, and the encoded packet 332 may contain data from the source packet TB2 only. After channel coding, the other physical layer procedures and functions, are executed on each RAT independently in an as such well-known manner. The encoded data packet 331 is transmitted via the RAT 1, and simultaneously, the encoded data packet 332 is transmitted via the RAT 2.

In the example embodiments shown in FIGS. 3a-3b different source packets can be scheduled according to the available resource at each RAT, and transmitted on each RAT with a common or independent channel coding.

At the receiving side (not shown), independent receivers can be adopted on each RAT. For the example case of the common channel coding (or encoding), suitable decoding can be arranged in a channel decoder at the receiver. Data packet multiplexing is performed before channel decoding. For the example case of the RAT-dependent channel coding, data packet multiplexing is performed after channel decoding.

The example embodiments shown in FIGS. 3a and 3b may be useful, for example, when trying to achieve high data rate in average to be supported compared with single RAT systems, or to more fully utilize the apparatus with multi-RAT capabilities and free spectrum.

Figure 4:
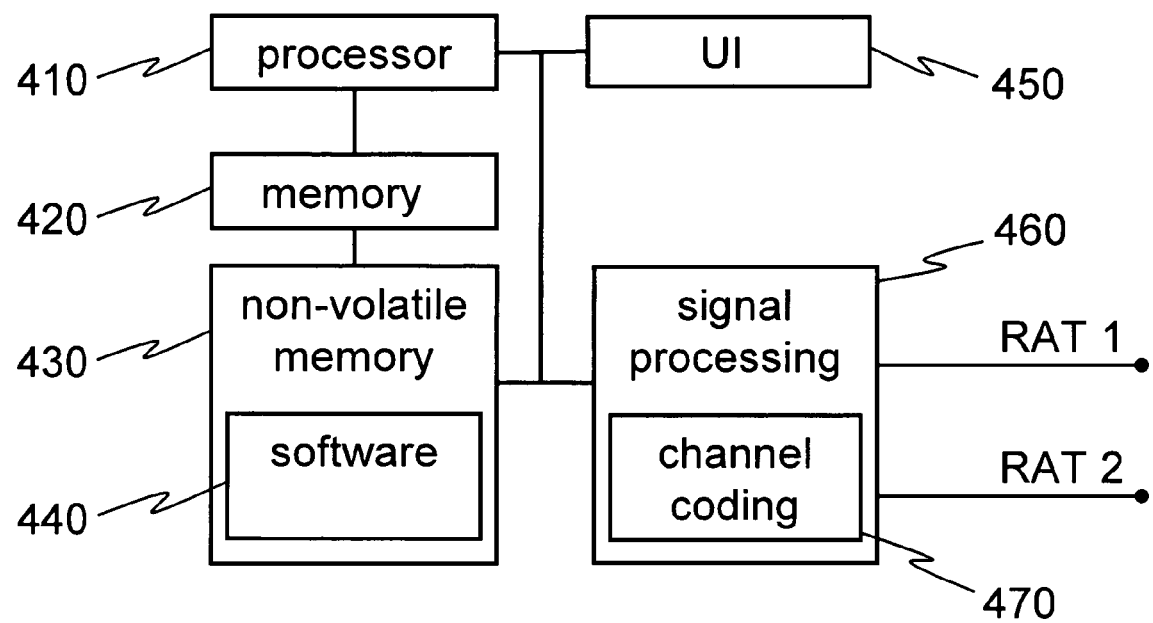
FIG. 4 shows a rough example block diagram of an apparatus according to certain example embodiments.

FIG. 4 shows an example block diagram of an apparatus 400 according to certain example embodiments of the invention. The apparatus 400 is generally suitable for functioning as a source or destination apparatus in a multi-radio access system. The apparatus may therefore be, for example, a mobile terminal or an infrastructure node.

The apparatus 400 comprises at least one non-volatile memory 430 configured to store computer program code (or software) 440. The apparatus 400 further comprises at least one processor 410 for controlling the operation of the apparatus 400 using the computer program code 440, a work memory 420 for running the computer program code 440 by the at least one processor 410. It also typically comprises a user interface 450 including a display and keyboard or keypad for user interaction. The at least one processor 410 may be a master control unit (MCU). Alternatively, the at least one processor 410 may be a microprocessor, a digital signal processor (DSP), an application specific integrated circuit (ASIC), a field programmable gate array, a microcontroller or a combination of such elements.

The apparatus 400 further comprises a signal processing section 460 which comprises various blocks for signal processing relating to transmission and/or reception of data packets over multiple radio access technologies (RAT 1, RAT 2, etc.). A protocol stack for multi-radio access communications used for communicating and processing data packets may be implemented by a suitable combination of software (program code 440) and hardware. The signal processing section 460 may be mainly constructed by hardware. For example, a channel coding unit 470 and other layer 1 units or operations may be implemented by hardware, while an operating system and higher layers of the protocol stack are typically implemented with the aid of software (program code 440). The signal processing block 460 may be used to implement a transmitter, a receiver and/or a transceiver. It may contain separate antennas for different radio-access technologies.

Depending on the implementation, the channel coding unit 470 shown in FIG. 4 may be a single unit or a combination of units. For the purpose of example embodiments involving data packet transmission (or processing data packets for transmission) the channel coding unit 470 is configured to perform channel encoding functions. In certain example embodiments, the channel coding unit or units 470 are shared between different radio-access technologies. For the purpose of example embodiments involving data packet reception, the channel coding unit 470 or alternatively another channel coding unit within the signal processing section is configured to perform channel decoding functions.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

We claim:

1. A method comprising:
communicating data using more than one radio-access technology in an apparatus comprising at least one radio frequency transmitter, at least one radio frequency receiver, and at least one antenna, wherein each radio-access technology includes a dedicated layer-2 functionality; and
sharing a channel-coding function in the apparatus between at least two of said more than one radio-access technology, wherein sharing the channel-coding function comprises using the shared channel-coding function to process a data packet of a user so as to perform channel coding by each of said at least two radio-access technologies to prepare its simultaneous transmission to a destination by said at least two radio-access technologies.

2. The method of claim 1, comprising:
using the shared channel-coding function to process a first and a second data packet of a user using the shared channel-coding function to prepare a simultaneous transmission of said first and second data packet by a first and second radio-access technology, respectively.

3. The method of claim 1, wherein communicating using more than one radio-access technology comprises communicating using at least two of different radio-access technologies taken from a group comprising mobile second generation, mobile third generation, mobile long term evolution, wireless local area networking, and wireless personal area network communication.

4. The method of claim 1, wherein the channel coding comprises turbo coding.

5. An apparatus comprising:
at least one radio frequency transmitter;
at least one radio frequency receiver;
at least one antenna;
at least one processor;
memory storing computer program code;
wherein the computer program code is configured to, with the at least one processor, cause the apparatus to perform actions comprising at least:
performing signal processing so as to communicate using more than one radio-access technology, wherein each radio-access technology includes a dedicated layer-2 functionality; and
wherein signal processing comprises sharing channel coding between at least two of said more than one radio-access technology, wherein sharing the channel-coding function comprises using the shared channel-coding function to process a data packet of a user so as to perform channel coding by each of said at least two radio-access technologies to prepare its simultaneous transmission to a destination by said at least to radio-access technologies.

6. The apparatus of claim 5, wherein the processor is a common channel coding processor configured to be used in each of said at least two radio-access technologies.

7. The apparatus of claim 5, wherein the apparatus is caused to use the shared channel-coding function to process a first and a second data packet of a user using the shared channel-coding function to prepare a simultaneous transmission of said first and second data packet by a first and second radio-access technology, respectively.

8. The apparatus of claim 5, wherein the apparatus is a mobile terminal.

9. The apparatus of claim 5, wherein communicating using more than one radio-access technology comprises communicating using at least two of different radio-access technologies taken from a group comprising mobile second generation, mobile third generation, mobile long term evolution, wireless local area networking, and wireless personal area network communication.

10. The apparatus of claim 5, wherein the channel coding comprises turbo coding.

11. An apparatus comprising:
at least one processor;
memory storing computer program code;
wherein the memory storing the computer program code is configured to, with the at least one processor, cause the apparatus to perform actions comprising at least:
communicating using more than one radio-access technology in an apparatus comprising at least one radio frequency transmitter, at least one radio frequency receiver, and at least one antenna, wherein each radio-access technology includes a dedicated layer-2 functionality; and
sharing a channel-coding function in the apparatus between at least two of said more than one radio-access technology, wherein sharing the channel-coding function comprises using the shared channel-coding function to process a data packet of a user so as to perform channel coding by each of said at least two radio-access technologies to prepare its simultaneous transmission to a destination by said at least to radio-access technologies.

12. The apparatus of claim 11, wherein the apparatus is a network infrastructure node.

13. A non-transitory computer readable medium storing a program of instructions, execution of which by a processor configures an apparatus to at least:
communicate using more than one radio-access technology in a radio communication apparatus comprising at least one radio frequency transmitter, at least one radio frequency receiver, and at least one antenna, wherein each radio-access technology includes a dedicated layer-2 functionality; and
share a channel-coding function in the apparatus between at least two of said more than one radio-access technology, wherein sharing the channel-coding function comprises using the shared channel-coding function to process a data packet of a user so as to perform channel coding by each of said at least two radio-access technologies to prepare its simultaneous transmission to a destination by said at least to radio-access technologies.

14. The non-transitory computer readable medium of claim 13, wherein execution of the program of instructions further configures the apparatus to at least use the shared channel-coding function to process a data packet of a user in the common channel coding unit to prepare its transmission by said at least two radio-access technologies to a destination simultaneously.

15. The non-transitory computer readable medium of claim 13, wherein execution of the program of instructions further configures the apparatus to at least process a first and a second data packet of a user in the common channel coding unit to prepare a simultaneous transmission of said first and second data packet by a first and second radio-access technology, respectively.

16. The non-transitory computer readable medium of claim 13, wherein communicating using more than one radio-access technology comprises communicating using at least two of different radio-access technologies taken from a group comprising mobile second generation, mobile third generation, mobile long term evolution, wireless local area networking, and wireless personal area network communication.

17. The non-transitory computer readable medium of claim 13, wherein the channel coding comprises turbo coding.

* * * * *

UNITED STATES PATENT AND TRADEMARK OFFICE
CERTIFICATE OF CORRECTION

PATENT NO. : 9,130,713 B2
APPLICATION NO. : 12/459571
DATED : September 8, 2015
INVENTOR(S) : Li et al.

Page 1 of 1

It is certified that error appears in the above-identified patent and that said Letters Patent is hereby corrected as shown below:

In the claims

Claim 5, col. 8, line 5 "at least to" should be deleted and --at least two-- should be inserted.

Claim 11, col. 8, line 45 "at least to" should be deleted and --at least two-- should be inserted.

Claim 13, col. 8, line 65 "at least to" should be deleted and --at least two-- should be inserted.

Signed and Sealed this
Fifteenth Day of December, 2015

Michelle K. Lee
*Director of the United States Patent and Trademark Office*